United States Patent [19]

Jolly

[11] 4,393,828
[45] Jul. 19, 1983

[54] ROTARY ENGINE

[76] Inventor: Frank H. Jolly, 1832 Glendale Dr., Arcata, Calif. 95521

[21] Appl. No.: 258,597

[22] Filed: Apr. 29, 1981

[51] Int. Cl.³ .............................................. F02B 53/08
[52] U.S. Cl. .................................... 123/203; 123/239; 418/248; 418/251
[58] Field of Search ................. 123/25 C, 191 A, 203, 123/216, 237, 239; 418/92, 97, 251, 248

[56] References Cited

U.S. PATENT DOCUMENTS

| | | | |
|---|---|---|---|
| 1,091,132 | 3/1914 | Harford | 123/237 X |
| 1,101,794 | 6/1914 | Friend | 123/237 |
| 3,060,915 | 10/1962 | Cole | 123/191 A X |
| 3,861,362 | 1/1975 | Kenyon | 123/239 |
| 3,894,519 | 7/1975 | Moran | 123/244 |
| 4,074,671 | 2/1978 | Pennila | 123/191 A |
| 4,170,978 | 10/1979 | Eslami | 123/239 |

FOREIGN PATENT DOCUMENTS 850935 9/1939 France ............................ 123/237

Primary Examiner—Michael Koczo

[57] ABSTRACT

This invention relates to a simplified design for a rotary internal combustion engine. The engine consists of rollers, acting as pistons and cranks, and specially designed vanes or seals which divide each roller housing into two working chambers. The vane is shaped in such a way that it is held down against the roller by the pressure of the gases which it is restraining. The vane on the expansion chamber also serves as the sealing valve on the outlet end of the fire tube. The engine cooling system is unique in the fact that the compressor is not cooled. The fire tube or combustion chamber is a titanium or high temperature material that is insulated from the rest of the engine. This tube is designed to stand the maximum temperatures and maximum pressures of combustion. The expander is cooled by a water injection spray which is introduced directly into the expansion chamber. Through cooling, the injected water removes energy from the gases and uses that energy to create steam for greater power. The engine lends itself to an open or closed cycle for the water injection.

1 Claim, 3 Drawing Figures

ROTARY ENGINE

DESCRIPTION

In general this invention relates to a simplified and highly efficient design for a rotary internal combustion engine. All engines which are in general use today (except for the turbine) use the same rotor for compression and for expansion. Their combustion chambers are variable in configuration, and change throughout the cycle. They generally use an external means for temperature control and have reciprocating and out-of-balance masses.

This engine eliminates all of these problems. There are basically four major moving parts—two rollers and two vanes. The vanes are the only reciprocating parts; their masses are small in respect to the rest of the engine and, therefore, cause little vibration.

The combustion chamber is a high temperature tube made of a ceramic or other high temperature material (i.e. titanium, stainless steel). Therefore the combustion chamber would not be cooled. There is no cooling on the outside of the engine. The volume of air brought through limits the maximum temperature achieved in the combustion chamber. A water injection nozzle is provided to squirt water vapor into the expansion chamber for expansion and cooling through evaporation.

The engine works by drawing in a charge of air, or air and fuel, through port N. The charge travels through a port in vane D, between vane D and the case L, and into intake chamber X. Roller C is forced to roll around the inside of case L in a counter-clockwise rotation, but in a clockwise direction by the eccentric B which is either formed on shaft A or is firmly affixed to it. A rolling seal is formed by C with L at the point of contact.

Vane D divides the intake chamber X from compression chamber Y. The projections on D and $D_1$ are used to hold the vane down against the roller. The projection has a seal at the outer end and the gases push it hard against the roller. The rolling seal between C and L moves around inside L moving the entrapped charge ahead of it. As the rolling seal approaches the compression side of vane D, the check valve G is opened by air pressure. E and $E_1$ point out the areas where sliding seals are necessary. Springs M and $M_1$ are used to hold vanes D and $D_1$ down against rollers C and $C_1$ but most of the hold-down pressure is furnished by the entrapped gases.

The charge is forced into combustion chamber J. Valve G closes and stops any reverse flow of gases. The outlet end of fire tube J is closed by the projection O, and vane $D_1$. The projection serves as a pressure-activated seal against roller $C_1$ and in the retracted position it also serves as a valve to close fire tube J while the compressor packs its charge into fire tube J through check valve G. The time this valve is closed can be varied by changing the thickness of projection O. (The charge of air in fire tube J is ignited at this time by an automotive plug, or by a charge of fuel injected Diesel-fashion which is ignited by the hot gases in fire tube J.)

Combustion chamber J stays hot from one burning time to another. The hot expanding gases are allowed to pass into expansion chamber Z where they force roller $C_1$ to act upon eccentric $B_1$ and spin shaft $A_1$.

All gases in chamber W are swept ahead of the roller and out below vane $D_1$ through the vane $D_1$ and out of port $N_1$.

Chamber X is an intake chamber, Y is a compression chamber, Z is an expansion chamber, and W is an exhaust chamber. All four functions (intake, compression, power, and exhaust) occur at the same time and continuously.

No cooling is provided for chamber J. The greatest temperature it is allowed to reach is below the temperature at which nitrogen will combine with oxygen to form any of the nitrous oxides. The maximum temperature in the compression-ignition engine is controlled by the amount of fuel injected. Chamber J is insulated from the engine by a layer of asbestos or other thermal materials.

Figure 2:
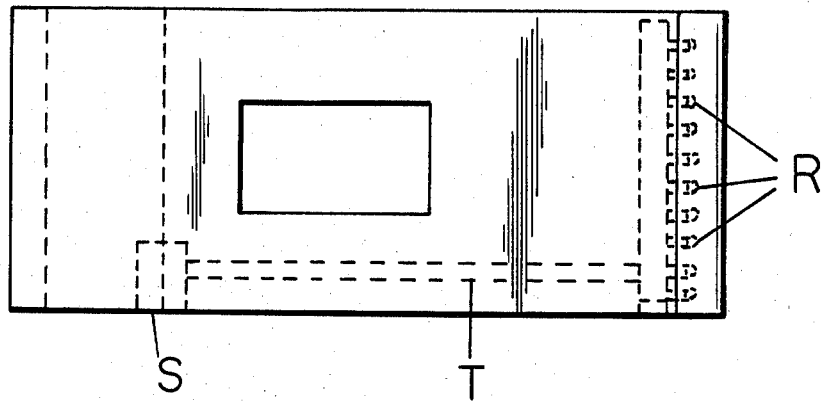
FIG. 2 is a view of vane $D_1$ of the expander. It shows the water passages used for cooling and for water injection.
Figure 3:
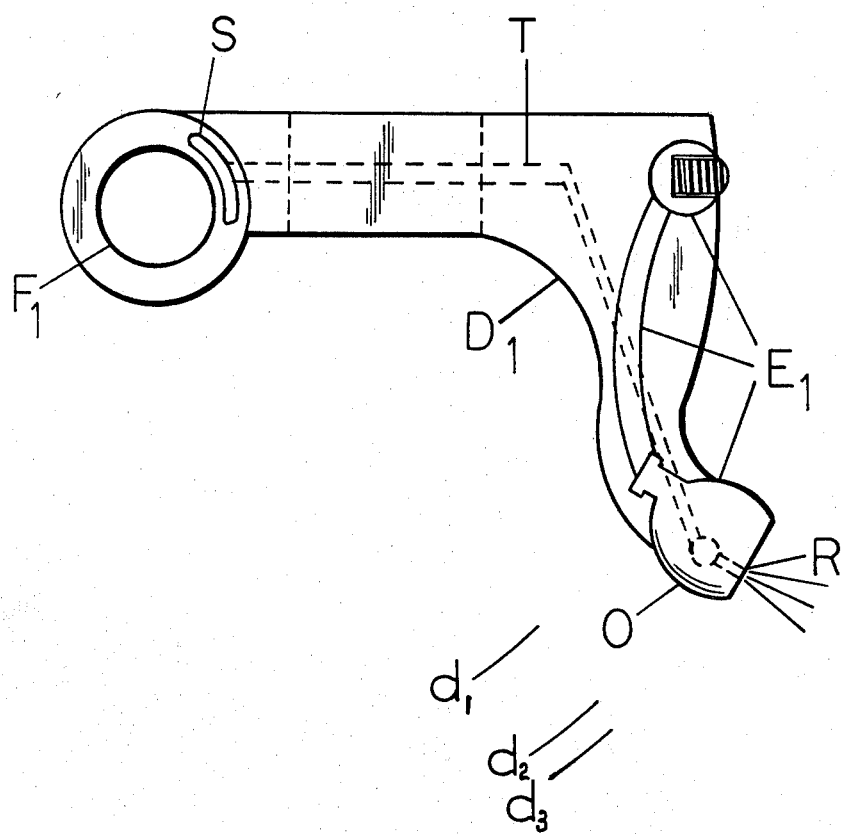
FIG. 3 is a side view of vane $D_1$ of the expander. It shows the seals and radii $d_1$, $d_2$, and $d_3$ used to determine the bias placed on the vane by the entrained gases.

FIGS. 2 and 3 are two enlarged views of expander vane $D_1$. These views show the cooling and water injection passages in the vane. S is a water inlet and timing valve. It times the opening and closing of the water injection automatically by going into and then out of index with the water passaage bored in the engine block. When the vane is up in the closed position, the water injection is shut off. The two passages index when the vane moves down and the hot gases start to enter the expansion chamber. The water flowing through T cools $D_1$ and its projection O. The water injects through several small passages R and is thereby reduced to a fine spray for quick cooling and steam production.

The faces of $D_1$ are circular in shape and are concentric around the pivot shaft $F_1$. The projection O on the outer end of $D_1$ has a length which is equal to radius $d_3$ minus radius $d_1$. The vane $D_1$ is sealed to the roller at the point equal to radius $d_2$. The gas pressures in the expansion chamber will be exposed to the projection O and will push down on the top of the projection over the area bounded by radius $d_3$ minus the radius $d_1$. These gas pressures will also go under the projection O and lift it on the area bounded by radius $d_3$ minus the radius $d_2$. By changing the shape of projection O and thereby the seal radius $d_2$, the amount of positive downward push can be calculated and controlled.

The projection O is the valve for the outlet of fire tube J. The front face of projection O controls the amount of rotation of the expansion roller while the fire tube outlet will be blocked.

In summary, the shape of vane $D_1$ controls the positive gas sealing vector, the time the fire tube is closed, and the timing of the water injection.

The pressures on the vane are perpendicular to its face and therefore, are picked up by shaft $F_1$. The forces not picked up by shaft $F_1$ are down against roller $C_1$ and aid in forcing it to revolve.

Figure 1:
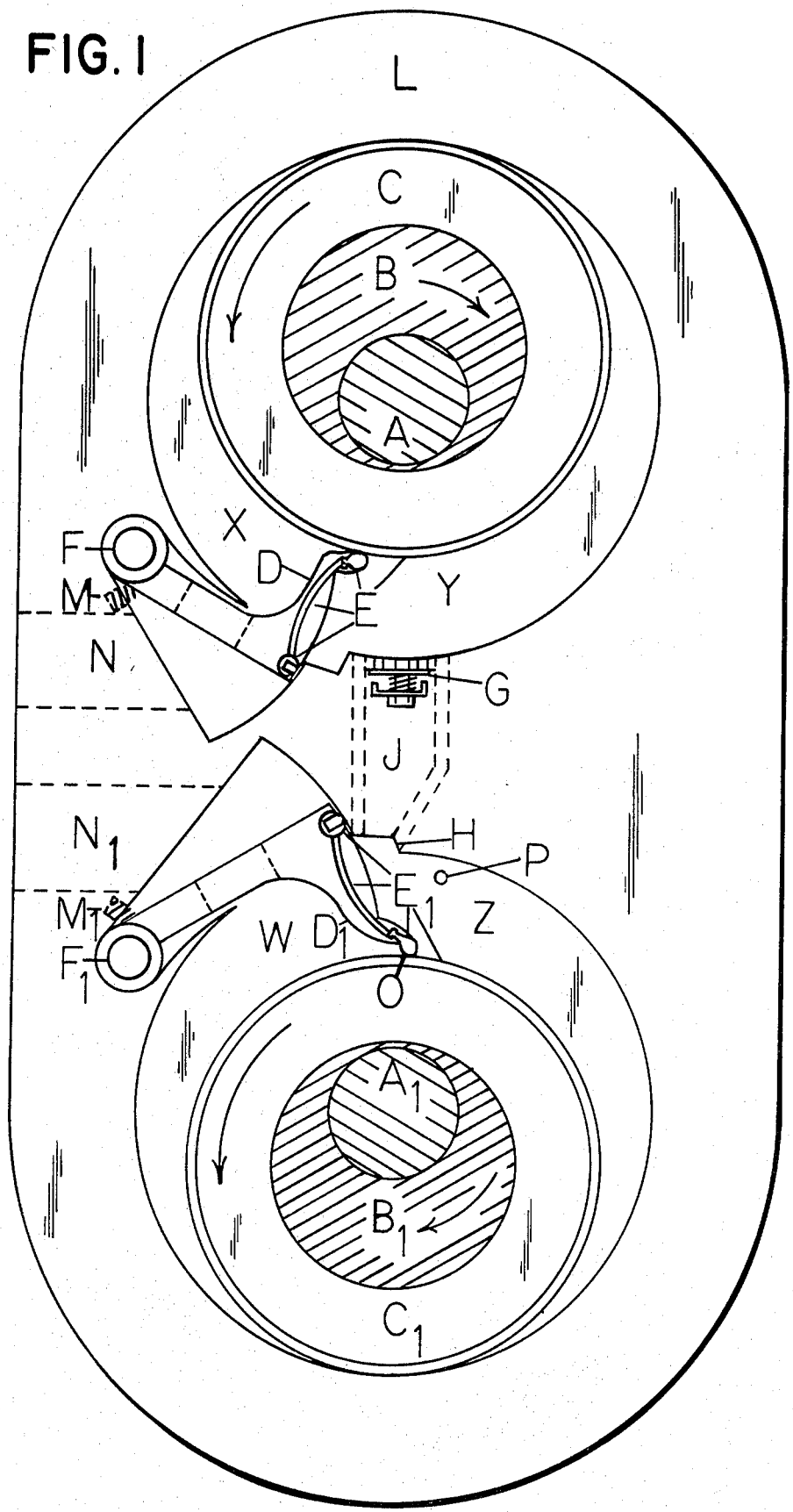
FIG. 1 is a cross-section perpendicular to the center line of the crank. It shows all moving parts of a single-expansion-area engine.

During high power requirements, a fine spray of water is also injected at P, (FIG. 1) directly into expansion chamber Z. This small amount of water vapor flashes to steam, increasing the expansion pressure and lowering the temperature within that chamber. This water helps to control the temperature of projection O, and the expansion chamber Z. Hole P can be located anywhere within expansion chamber Z.

In a two-expansion-chamber engine, a second set of rollers and eccentric are affixed to shafts A and $A_1$. The second set of eccentrics would be placed 180° opposite to eccentrics B and $B_1$ on each crank.

In a 3-chamber engine, the eccentrics would be positioned at 120° intervals.

Power is produced for a large proportion of each rotation. On a single-expansion-chamber engine of the illustrated cross-section, power is produced for 320° of each 360° rotation.

Due to the high temperature at which the combustion chamber J can be maintained, almost any injectable fuel can be burned. All residuals of unburned hydrocarbons due to wall condensation are eliminated.

What is claimed:

1. An internally-cooled rotary engine comprising:

two connected housings with hollow chambers therein; said chambers interconnected by a high temperature fire tube, said fire tube composed of high temperature material, said fire tube insulated from said housing by high temperatures insulation material and air space, said fire tube maintained at high temperature;

one of said chambers comprising a compression chamber, said chamber affixed with inlet means for gaseous mixture, said chamber equipped with a roller rotatably mounted on an eccentric crank to rotate inside said chamber, said roller equipped with resilient circular face seals, said chamber housing a rocking vane dividing said chamber into separate intake and compression volumes, said rocking vane mounted in said chamber with a shaft, said rocking vane sealed to said roller with a projection shaped to seal by entrained gas pressure, said rocking vane sealed to said chamber by resilient seals on face, projection, and sides, said rocking vane being lightly pressed against said roller by spring means;

the second of said chambers comprising an expansion chamber affixed with outlet means for expanded gases and steam, said second chamber equipped with a roller rotatably mounted on an eccentric crank to rotate inside said chamber, said roller equipped with resilient circular face seals, said second chamber housing a rocking vane dividing said chamber into separate expansion and exhaust volumes, said rocking vane mounted in said chamber with a shaft, said rocking vane sealed to said roller with a projection shaped to seal by entrained gas pressure, said rocking vane sealed to said chamber by resilient seals on face, projection, and sides, said rocking vane being lightly pressed against said roller by spring means, said second chamber affixed with inlet control and timing means by a projection valve on said rocking vane; said second chamber affixed with water injection means by hollow passages and spray nozzles in said rocking vane, said second chamber having a displacement equal to or greater than the displacement of the compression chamber.

* * * * *